(12) United States Patent
Haerterich et al.

(10) Patent No.: US 12,235,990 B2
(45) Date of Patent: Feb. 25, 2025

(54) DATA OBSCURING FOR PRIVACY-ENHANCEMENT

(71) Applicant: SAP SE, Walldorf (DE)

(72) Inventors: Martin Haerterich, Wiesloch (DE); Benjamin Weggenmann, Karlsruhe (DE)

(73) Assignee: SAP SE, Walldorf (DE)

( * ) Notice: Subject to any disclaimer, the term of this patent is extended or adjusted under 35 U.S.C. 154(b) by 258 days.

(21) Appl. No.: 17/751,397

(22) Filed: May 23, 2022

(65) Prior Publication Data

US 2023/0376626 A1   Nov. 23, 2023

(51) Int. Cl.
*G06F 21/62* (2013.01)

(52) U.S. Cl.
CPC ............... *G06F 21/6245* (2013.01)

(58) Field of Classification Search
CPC ............ G06F 21/6245; G06F 21/6254; G06F 18/24; G06N 3/043; G06N 3/0455; G06N 3/084

See application file for complete search history.

(56) References Cited

U.S. PATENT DOCUMENTS

| | | | | |
|---|---|---|---|---|
| 2010/0074437 A1* | 3/2010 | Inami | ............... | H04N 1/444 380/28 |
| 2010/0091337 A1* | 4/2010 | Yoshio | ............... | H04N 1/444 382/100 |
| 2018/0336463 A1 | 11/2018 | Bloom | | |
| 2020/0020098 A1* | 1/2020 | Odry | ............... | G06N 3/045 |
| 2020/0082916 A1 | 3/2020 | Polykovskiy et al. | | |
| 2020/0366914 A1* | 11/2020 | Schroers | ............... | G06N 3/045 |
| 2021/0150305 A1 | 5/2021 | Amiri et al. | | |
| 2021/0276547 A1 | 9/2021 | Narayanan et al. | | |
| 2022/0070150 A1 | 3/2022 | Haerterich et al. | | |
| 2022/0084173 A1* | 3/2022 | Liang | ............... | G06N 3/045 |
| 2022/0101096 A1* | 3/2022 | Singer | ............... | G06N 3/042 |
| 2022/0172050 A1* | 6/2022 | Dalli | ............... | G06N 3/045 |
| 2023/0038935 A1* | 2/2023 | Kothari | ............... | G06N 3/045 |
| 2023/0197289 A1* | 6/2023 | deLaubenfels | ............... | G16H 50/80 705/2 |

(Continued)

OTHER PUBLICATIONS

"Watrix Technology", Biometric Update, [Online]. Retrieved from the Internet: <URL: https://www.biometricupdate.com/companies/watrix-technology>, (Accessed May 18, 2022), 4 pgs.

(Continued)

*Primary Examiner* — Richard G Keehn
(74) *Attorney, Agent, or Firm* — SCHWEGMAN LUNDBERG & WOESSNER, P.A.

(57) ABSTRACT

Various examples are directed to systems and methods for obscuring private information in input data. A system may apply an encoder model to an input data unit to generate a latent space representation of the input data unit. The system may apply multi-dimensional noise to the latent space representation of the input data unit, the multi-dimensional noise having a first value in a first latent space dimension and a second value different than the first value in a second latent space dimension. The system may apply a decoder model to the latent space representation of the input data unit to generate an obscured data unit.

20 Claims, 7 Drawing Sheets

(56) References Cited

U.S. PATENT DOCUMENTS

2023/0222176 A1* 7/2023 Honke ............ G06F 18/24143
702/19

OTHER PUBLICATIONS

Cresswell, Antonia, et al., "Inverting The Generator Of A Generative Adversarial Network", [Online]. Retrieved from the Internet: <URL: https://arxiv.org/pdf/1802.05701.pdf>, (2018), 8 pgs.

Dwork, C, et al., "Calibrating noise to sensitivity in private data analysis", in Proceedings of the Third Conference on Theory of Cryptography, ser. TCC'06. Berlin, Heidelberg: Springer-Verlag, <http://dx.doi.org/10.1007/1168187814>, (2006), 265-284.

Galer, Susan, "SAP Medical Research Insights receives Red Dot Award", SAP News Center (in German with English translation), [Online]. Retrieved from the Internet: <URL: [6] https://news.sap.com/germany/2015/11/sap-medical-research-insights-erhalt-red-dot-award/>, (Nov. 23, 2015), 11 pgs.

Kim, Jayoung, et al., "Wearable Biosensors for healthcare monitoring", Nature Biotechnology, [Online]. Retrieved from the Internet: <URL:, (2019), 18 pgs.

Kwapisz, Jennifer, et al., "Activity Recognition using Cell Phone Accelerometers", Sensor, KDD, (2010), 9 pgs.

"U.S. Appl. No. 17/010,501, Examiner Interview Summary mailed Sep. 19, 2024", 2 pgs.

"U.S. Appl. No. 17/010,501, Final Office Action mailed Oct. 2, 2023", 33 pgs.

"U.S. Appl. No. 17/010,501, Non Final Office Action mailed Apr. 21, 2023", 29 pgs.

"U.S. Appl. No. 17/010,501, Non Final Office Action mailed May 15, 2024", 29 pgs.

"U.S. Appl. No. 17/010,501, Response filed Feb. 2, 2024 to Final Office Action mailed Oct. 2, 2023", 13 pgs.

"U.S. Appl. No. 17/010,501, Response filed Jul. 21, 2023 to Non Final Office Action mailed Apr. 21, 2023", 14 pgs.

"U.S. Appl. No. 17/010,501, Response filed Sep. 16, 2024 to Non Final Office Action mailed May 15, 2024", 12 pgs.

"Saliency Maps in Tensorflow 2.0", UR Machine Learning Blog, Data Scientist at City of Edmonton, [Online]. Retrieved from the Internet: <URL: https://usmanr149.github.io/urmlblog/cnn/2020/05/01/Salincy-Maps.html>, (May 1, 2020), 3 pgs.

"Watrix Technology", Biometric Update, [Online]. Retrieved from the Internet: <URL: https://www.biometricupdate.com/companies/watrix-technology>, (Accessed Jul. 17, 2023), 4 pgs.

Alguliyev, Rasim M, et al., "Privacy-preserving deep learning algorithm for big personal data analysis", Journal of Industrial Information Integration, 15, (Sep. 2019), 1-14.

Chen, Xiao, et al., "Distributed Generation of Privacy Preserving Data with User Customization", arXiv:1904.09415v1, (2019), 20 pgs.

Cresswell, Antonia, et al., "Inverting the Generator of a Generative Adversarial Network", arXiv: 1802.05701v1, [Online]. Retrieved from the Internet: <URL: https://arxiv.org/pdf/1802.05701.pdf>, (2018), 8 pgs.

Dwork, C., et al., "Calibrating noise to sensitivity in private data analysis", In Proceedings of the Third Conference on Theory of Cryptography, ser. TCC'06. Berlin, Heidelberg: Springer-Verlag, [Online] Retrieved from the internet: <http://dx.doi.org/10.1007/1168187814>, (2006), 265-284.

Galer, Susan, "SAP Medical Research Insights receives Red Dot Award", SAP News Center (in German with English translation), [Online]. Retrieved from the Internet: <URL: https://news.sap.com/germany/2015/11/sap-medical-research-insights-erhalt-red-dot-award/>, (Nov. 23, 2015), 11 pgs.

Galer, Susan, "SAP Wins Red Dot Award", [Online]. Retrieved from the Internet: <URL: https://news.sap.com/2015/11/sap-medical-research-insights-wins-red-dot-award/>, (2015), 5 pgs.

Hern, Alex, "Fitness tracking app strava gives away location of secret US army bases", The Guardian, [Online]. Retrieved from the Internet: <URL: https://www.theguardian.com/world/2018/jan/28/fitness-tracking-app-gives-away-location-of- secret-US-army-bases.>, (2018), 4 pgs.

Kim, Jayoung, et al., "Wearable Biosensors for healthcare monitoring", Nature Biotechnology, [Online]. Retrieved from the Internet: <URL: https://www.researchgate.net/publication/331329696_Wearable_biosensors_for_healthcare monitoring>, (2019), 18 pgs.

Kwapisz, Jennifer, et al., "Activity Recognition using Cell Phone Accelerometers", Sensor, KDD, [Online]. Retrieved from the Internet: <URL: https://www.researchgate.net/publication/220520200_Activity_Recognition_Using_Cell_Phone_Accelerometers>, (2010), 9 pgs.

Ma, Yue, et al., "Long Short-Term Memory Autoencoder Neural Networks Based DC Pulsed Load Monitoring Using Short-Time Fourier Transform Feature Extraction", IEEE 29th International Symposium on Industrial Electronics (ISIE), (Jun. 2020), 912-917.

Majumder, Sumit, et al., "Smartphone sensors for health monitoring and diagnosis.", Sensors, 19, (2019), 45 pgs.

Malekzadeh, Mohammad, et al., "Replacement AutoEncoder: A Privacy-Preserving Algorithm for Sensory Data Analysis", arXiv:1710.06564v3, (2018), 12 pgs.

Seshadri, Dhruv, et al., "Wearable sensors for monitoring the internal and external workload of the athlete", npj Digit. Med. 2, 71, [Online]. Retrieved from the Internet: <URL: https://www.nature.com/articles/s41746-019-0149-2.pdf>, (2019), 18 pgs.

Voynov, Andrey, et al., "Unsupervised Discovery of Interpretable Directions in the GAN Latent Space", arXiv:2002.03754, (2020), 15 pgs.

Zhao, Shengjia, et al., "InfoVAE: Information maximizing variational autoencoders.", arXiv:1706.02262v1, (2017), 11 pgs.

Zhou, et al., "Human Activity Recognition Based on Improved Bayesian Convolution Network to Analyze Health Care Data Using Wearable IoT Device", IEEE Access, vol. 8, (Apr. 2020), 1-8.

* cited by examiner

DATA OBSCURING FOR PRIVACY-ENHANCEMENT

BACKGROUND

Large-scale collection and processing of data have become important drivers for the digital economy. Various enterprises collect and use large-scale data for various purposes including, predictive maintenance, business planning, disease diagnosis, and the like. Various data types may be collected and used including, for example, structured data, such as images; sequential data, such as business figures, time-series, or continuous streams of sensor data; and unstructured or graph-based data.

BRIEF DESCRIPTION OF DRAWINGS

The present disclosure is illustrated by way of example and not limitation in the following figures.

DETAILED DESCRIPTION

Figure 1:
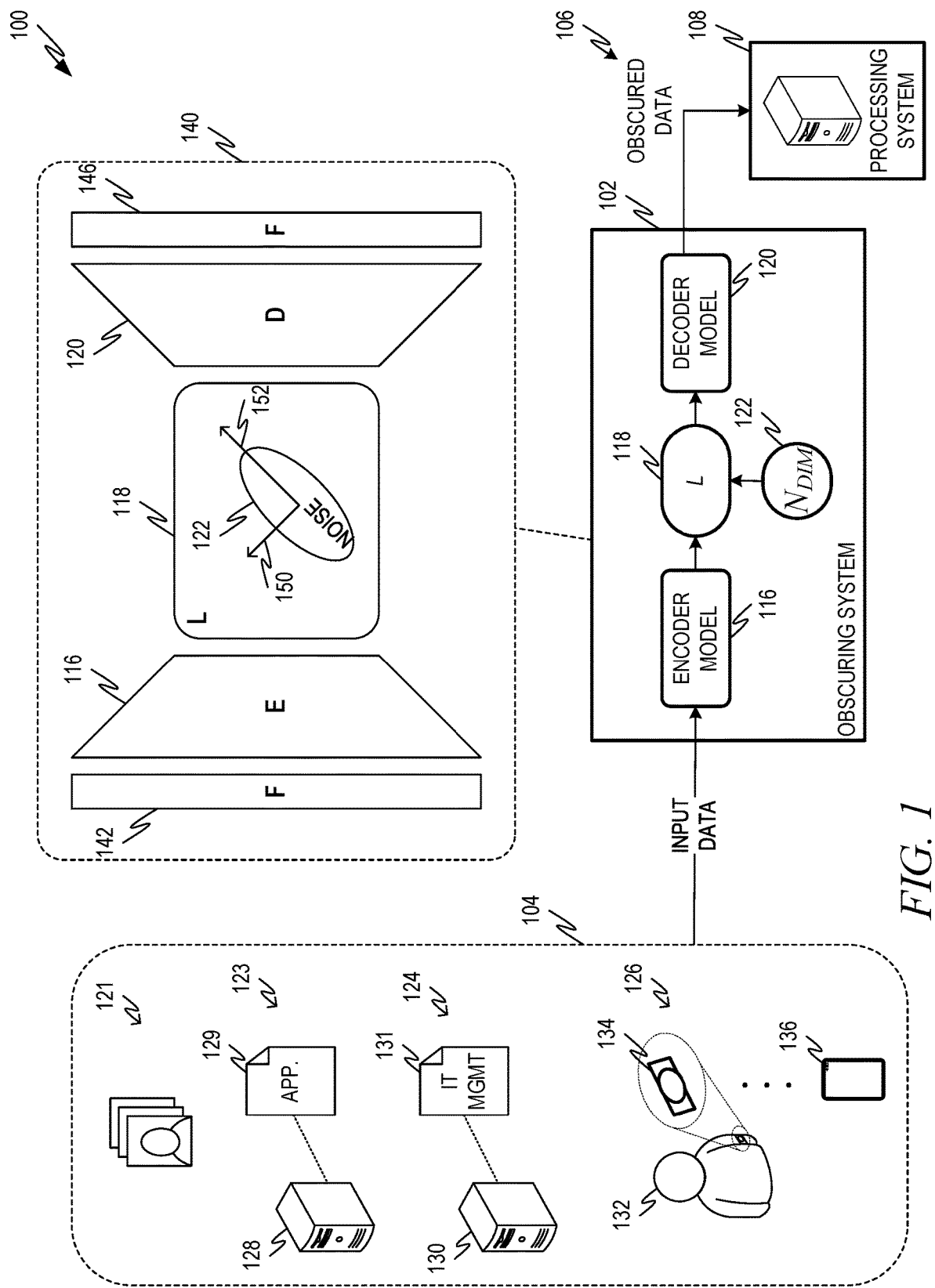
FIG. 1 is a diagram showing one example of an environment for implementing an encoder-decoder arrangement to obscure input data.

Many common uses of large data collections can involve disclosure or a risk of disclosure. For example, many uses of collected data involve comparing the data to a peer group or otherwise using the data in a manner that involves sharing with partners or data analysts. While some private information, such as personal identifiers, may be removed from a data collection or pseudonymized, there may remain characteristic patterns that can reveal private or sensitive information. For example, sensor stream data from an accelerometer at a user's mobile device may reveal the user's identity by capturing the user's unique gait. Also, it may be difficult, for example, to remove identifying information from images that depict a user without compromising the usefulness of the image for further processing. Further, even if a data unit does not expose private information directly, the data unit and/or the uses thereof may leak private information. For example, data describing business processes may leak private information about patterns related to the processes or even strategic decisions.

The privacy implications of data collection and usage affect the operation of computing systems in numerous ways. For one, data owners may be reluctant to share data for use with various computing systems without assurance that private aspects of the data will remain private. For example, a user may be less likely to share accelerometer or other mobile device data streams without assurance that the user's identity will be protected. Also, for example, a business entity may be less likely to share its business data for analysis without assurance that the business entity's private information is protected. When data owners are reluctant to share data, the quality of the resulting processing may suffer. Consider an example data processing system that is programmed to characterize user movements based on data streams from users' mobile device. In this example, if users are reluctant to share data, the data processing system may be limited in the data that is available, for example, to train machine learning models and/or perform other analysis. The data processing systems may execute less accurately and effectively using models that were trained with smaller and/or less representative training data sets. Also, some jurisdictions have enacted laws that protect user privacy by preventing the use of user data that can be used to identify the user. This can further limit the data available to data processing systems for model training or other purposes.

In some examples, a data set may be obscured before it is exposed to analysts, partners or other similar entities. Obscuring a data set may involve modifying the value of various data units in the data set to lessen the possibility that private information can be gleaned from the data units and/or from models trained with the data units.

In some examples, data obscuring can be performed using an encoder-decoder arrangement, such as a Variational Autoencoder (VAE). In an encoder-decoder arrangement, an encoder model receives an input data unit and transforms the input data unit from a feature space to a latent space. This results in a latent space representation of the input data unit. The latent space representation is provided to a decoder model. The decoder model is trained to convert the latent space representation back to the feature space, generating an obscured data unit that is a re-creation of the original input data unit.

An encoder-decoder arrangement obscures the input data unit due to the lossy nature of the encoder model. The latent space representation of an input data unit, as generated by the encoder model, has a lower dimensionality than the input data unit itself. Consider an example in which the input data unit is a sensor data stream from a user's mobile device. In this example, the dimensionality of the sensor data stream is based on the number of quantities measured by the mobile device and the number of time samples in the series. The latent space representation generated by the encoder may be or include a state vector, where the state vector has a lower dimensionality than the sensor data stream. Accordingly, the encoder model acts as a lossy compression function. By reducing the dimensionality of the sensor data stream, the encoder model causes the loss of information from the sensor data stream. The lost information is not recovered by the decoder. As a result, the encoder-decoder system may reduce distinctive patterns included in a sensor data stream that might uniquely identify the associated user without destroying the usefulness of the obscured data stream to a data processing system.

In some examples, an encoder-decoder arrangement, as described herein, also utilizes noise applied in the latent space. Noise, for example, according to a Gaussian or other suitable noise function, is applied to the latent space representation and, thereby, may be a parameter of the encoder-decoder arrangement (e.g., of an autoencoder comprising the encoder model and the decoder model). Applying noise to the latent space representation adds uncertainty or noise to the resulting obscured data stream. The uncertainty or noise may further reduce or obscure any distinctive patterns included in the input data units that might include private or sensitive information.

In various examples, however, obscuring due to the lossy nature of the encoder-decoder arrangement and/or due to the application of latent space noise may be isotropic. That is, all dimensions of the latent space representation of an input data unit may be obscured, on average, by the same amount. This may limit the usefulness of the obscuring in some implementations. For example, isotropic obscuring sufficient to adequately protect latent space dimensions that carry private information may excessively obscure latent space dimensions that carry utility information used by the data processing systems. This may make the resulting obscured data less useful for its intended purpose.

Various examples address these and other challenges using anisotropic obscuring techniques. For example, an obscuring system may apply multi-dimensional noise to a latent space representation of a data unit. Multi-dimensional noise may have different values in different latent space dimensions. The obscuring system may determine interpretable dimensions in the latent space and vary the value of the multi-dimensional noise at the different latent space dimensions. For example, the multi-dimensional noise may have a first value along a first latent space dimension, a second value along a second latent space dimension, and so on. The multi-dimensional noise may have a higher value along latent space dimensions that carry more private information and a relatively lower value along latent space dimensions that carry more utility information and less private information. In this way, portions of the input data unit that are private may be more heavily obscured while portions of the input data unit that are not private and/or utility-related may be less obscured. The result may be an obscured data unit that more effectively protects private information without unduly obscuring the utility information.

FIG. 1 is a diagram showing one example of an environment 100 for implementing an encoder-decoder arrangement to obscure input data 104. The environment 100 includes an obscuring system 102. The obscuring system 102 receives input data 104 and generates corresponding obscured data 106. The obscured data 106 is provided to a data processing system 108. The data processing system 108 uses the obscured data 106 to perform various tasks, as described herein. Relative to the input data 104, the obscured data 106 may omit data or data patterns that that identify private information.

The obscuring system 102 receives the input data 104 and generates obscured data 106. The obscuring system 102, in some examples, comprises one or more computing devices that are distinct from mobile computing devices 134, 136, computing systems 128, 130, and/or from the data processing system 108. In other examples, the obscuring system 102 is implemented by the one or more of the mobile computing devices 134, 136, the computing systems 128, 130, and/or by the data processing system 108. For example, some or all of the obscuring system 102 may execute at a processor of the mobile computing device 134, 136 and/or at a processor of the data processing system 108.

The obscuring system 102 implements an encoder-decoder arrangement. An encoder model 116 receives the input data 104 and generates a corresponding representation of the input data 104 in latent space 118. As described herein, the conversion of the input data 104 to a latent space representation may be a lossy compression. For example, the latent space 118 may have a smaller dimensionality than the input data 104. The encoder-decoder arrangement may be implemented as a VAE. Also, in some examples, the encoder model 116 may be implemented as a Generative Adversarial Network (GAN) or GAN-like generative model with the decoder model 120 being the inverse of the GAN or GAN-like generative model implementing the encoder model 116.

The obscuring system 102 may apply multi-dimensional noise 122 to the latent space representation of the input data 104 at the latent space 118. The multi-dimensional noise 122 may be vector-valued, for example, according to a plurality of linearly independent vectors corresponding to dimensions of the latent space, as described herein. The multi-dimensional noise 122 may be anisotropic. For example, the multi-dimensional noise 122 may not be uniform across the dimensions of the latent space 118. For example, the multi-dimensional noise 122 may have different values corresponding to different latent space dimensions. In some examples, described herein, the obscuring system 102 determines interpretable dimensions of the latent space 118 and generates the multi-dimensional noise based on the interpretable dimensions.

The environment 100 of FIG. 1 may be utilized with various kinds of input data 104. Also, different types of input data 104 may be used by the data processing system 108 to perform different tasks. In some examples, the input data 104 includes image data 121. Image data 121 may include one or more images. An input data unit of image data 121, for example, may include one image or a set of images. The data processing system 108 may use image data 121 to perform various tasks such as, for example, image classification tasks. Consider an example in which the image data 121 includes images depicting various objects, such as human faces or other things. The data processing system 108 may be programmed to classify images according to the type of object depicted. The image data 121 (e.g., after obscuring) may be used as training data to train a classifier model at the data processing system 108 and/or as test data.

In some examples, the input data 104 includes application data 123. Application data 123 includes data generated by one or more applications 129 executing at one or more computing systems 128. An input data unit of application data 123 may include, for example, a record from a database table, a database table, a database view, or any other suitable arrangement of input data. In examples where the input data 104 includes application data 123, the data processing system 108 may be programmed to perform various processing tasks using the application data 123. Consider an example in which the application 129 is a business application such as, for example, an accounting application, a process management application, and/or the like. In this example, the data processing system 108 may be programmed to, for example, perform demand planning tasks, detect fraudulent transactions, and/or other suitable tasks. The application data 123 may be used to train a machine learning model at the data processing system 108 and/or may be used as test data.

In some examples, the input data 104 includes information technology (IT) data 124. IT data 124 may be generated by an IT management application 131 executing at a computing system 130. The IT data 124 may describe various IT-related events and/or other relevant data. Input data units including IT data 124 may include, for example, log entries describing IT-related events and/or the like. In examples where the input data 104 includes IT data 124, the data processing system 108 may be programmed to perform various processing tasks using the IT data 124. In some examples, the IT data 124 includes records of accesses to a computing system. The data processing system 108 may be programmed to apply a classifier or other suitable machine learning model to detect attacks and/or other malicious or potentially malicious access to the computing system. In another example, IT data 124 includes asset and usage data for the computing system. The data processing system 108 may be programmed to utilize the IT data 124 to predict future demand in the computing system for resource planning. IT data 124 may be used to train a machine learning model at the data processing system 108 and/or may be used as test data.

In some examples, the input data 104 includes sensor stream data generated, for example, by one or more mobile computing devices 134, 136 of a user 132. The mobile computing devices 134, 136 may be or include any suitable computing devices including, for example, desktop computers, laptop computers, tablet computers, wearable computers, and the like. In the example of FIG. 1, the mobile computing device 134 is depicted as a wearable computing device and the mobile computing device 136 is depicted as a mobile phone. It will be appreciated that the user 132 may utilize one or more other mobile computing device not shown in FIG. 1 in addition to or instead of the example device or devices shown.

In some examples, input data units of a sensor stream data 126 may include one or more quantities measured at the respective mobile computing devices 134, 136 with respect to time. For example, a quantity may indicate a quantity measured by a sensor at the mobile computing device 134, 136 and a time may indicate a time when the quantity was sampled (e.g., from the relevant sensor at the mobile computing device 134, 136). Consider an example mobile computing device 134, 136 including a geographic positioning system, a heart rate or electrocardiogram (ECG) sensor, a respiratory sensor, and a muscle oxygen sensor. Such a mobile computing device 134, 136 may generate sensor stream data 126 that includes a quantity dimension for the output of each of the sensor or sensors at the mobile computing devices 134, 136.

In some examples, sensor stream data 126 may include multiple quantity dimensions. Sensor stream data 126 may include more than one quantity dimension, for example, if it is based on a sensor that generates a multidimensional output. Consider an example accelerometer that generates an output indicating the acceleration of the sensor in each of three spatial dimensions. Such an accelerometer may generate a sensor data stream having three quantities versus time (e.g., acceleration in the x direction, acceleration in the y direction, and acceleration in the z direction). Consider also an example gyroscopic sensor that generates a sensor data stream also having three quantities versus time (e.g., roll, pitch, and yaw).

FIG. 1 shows a breakout window 140 including a representation of the operation of the encoder model 116 and decoder model 120 acting on an example input data unit 142. The input data unit 142 may be any suitable data unit such as, for example, a unit of image data 121, a unit of application data 123, a unit of IT data 124, sensor stream data, and/or the like. The input data unit is initially a feature space representation that may be described by different input data unit features, described in more detail herein. The encoder model 116 acts on the input data unit 142 to generate a latent space representation of the input data unit 142 in the latent space 118. As described herein, the lossy nature of the encoder model 116 may tend to provide isotropic obscuring of the input data unit 142.

Consider an example input data unit that is an image from the image data 121. The input data unit may have various features including, background pixel values, foreground pixel values, and the like. Consider another example input data unit that includes a data record from application data 123 and/or from IT data. The input data unit may have various features including, for example, field values for the various fields of the data record. Consider another example input data unit that is a sensor stream data 126. The sensor stream data may have input data unit features including, the values generated by one or more sensors over time.

In the example shown in the breakout window 140, the obscuring system 102 applies multi-dimensional noise 122 having different values for two example latent space dimensions 150, 152. In various examples, however, multi-dimensional noise 122 may be applied with different values across more than two latent space dimensions. As shown, a multi-dimensional noise 122 has a higher value in the latent space dimension 152 than in the latent space dimension 150. In this way, the obscuring applied by the multi-dimensional noise 122 may be anisotropic. Information from the input data unit carried by the latent space representation in the latent space dimension 152 may be more obscured than information carried in the latent space dimension 150.

After the multi-dimensional noise 122 is applied to the latent space representation in the latent space 118, the latent space representation is provided to the decoder model 120. The decoder model 120 generates an obscured data unit 146, which is mapped back to the feature domain. The obscured data unit 146 may be more obscured with respect to information carried in the latent space dimension 152 and less obscured with respect to information carried in the latent space dimension 150.

The obscuring system 102 may be programmed to select the multi-dimensional noise 122 to correspond to information in the input data 104 that is private or sensitive and to information in the input data 104 that is utilized by the data processing system 108. For example, the obscuring system 102 may identify interpretable dimensions of the latent space 118. Interpretable dimensions of the latent space 118 are dimensions for which changes to a latent value z in the latent space dimension cause a predictable and/or interpretable change in the obscured data 106.

The obscuring system 102 may map the features of the input data unit to latent space dimensions of the latent space representation of the input data unit. This may be performed in various ways including, for example, using a utility classifier and private classifier as described herein. Because the dimensionality of the latent space is less than the dimensionality of the feature space, there may not be a one-to-one correlation between the various input features and latent space dimensions. For example, the obscuring system 102 may assign utility attribution labels and privacy attribution labels to each relevant latent space dimension. The value of the multi-dimensional noise 122 in each latent space dimension may be related to the utility attribution label for the dimension and the privacy attribution label for the dimension. For example, the multi-dimensional noise 122 may have a relatively higher value for a latent space dimension having a higher privacy attribution label than utility attribution label. Similarly, the multi-dimensional noise 122 may have a relatively lower value for a latent space dimension having a higher utility attribution label than privacy attribution label. In this way, the obscured data 106 may be relatively more obscured with respect to privacy task features and relatively less obscured with respect to utility task features.

Consider an example input data unit that is an image from the image data 121. In this example, the data processing system 108 may implement a machine learning model to classify an object depicted by the image. A first latent space component may be derived from an input data feature including pixel values making up a background of the image. A second latent space component may be derived from an input data feature including pixel values corresponding to the object. The former may be classified as a private feature. For example, the background of the image may not be used to classify the object and may depict people and/or things in the background that are private.

In this example, the obscuring system 102 may map the first input feature and the second input feature to latent space dimensions at the latent space 118. The obscuring system 102 may select the multi-dimensional noise 122 to have a higher value in latent space dimensions that are more representative of the background pixel values of the first input data feature and to have a lower value in latent space dimensions that are more representative of the object pixel values of the second input data feature.

Obscured data 106 generated by the obscuring system 102 may be provided to the data processing system 108. The data processing system 108 may perform various processing tasks using the obscured data 106. In some examples, the data processing system 108 is configured to generate machine learning models utilizing the obscured data 106. For example, the obscured data 106 may be used as training data for training a machine learning model. The trained machine learning model may be applied by the data processing system 108 and/or may be provided to one or more mobile computing devices 134, 136 or computing systems 128, 130 to be applied directly to input data 104.

Figure 2:
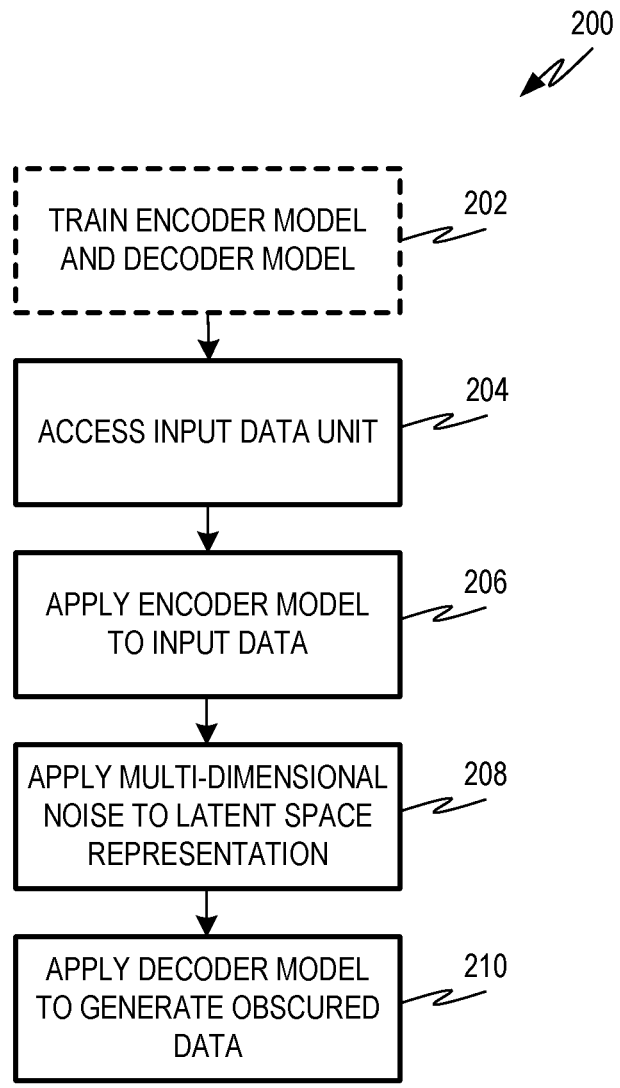
FIG. 2 is a flowchart showing one example of a process flow that may be executed by the obscuring system to generate the obscured data.

FIG. 2 is a flowchart showing one example of a process flow 200 that may be executed by the obscuring system 102 to generate the obscured data 106. At optional operation 202, the obscuring system 102 trains the encoder model 116 and the decoder model 120. Optional operation 202 may be executed when the models 116, 120 are or include trained machine-learning models, such as deep neural networks. For example, the models 116, 120 may be trained together as a VAE. The obscuring system 102 may train the models 116 using training data, where the training data comprises a training input data. The training input data stream may be the input data 104 or another suitable sensor data stream.

The obscuring system 102 provides the training input data to the encoder model 116 to generate a training latent space representation. The training latent space representation is provided to the decoder model 120, for example, without multi-dimensional noise being applied. The output of the decoder model 120 is compared to the training input data. Deviations between the output of the decoder model 120 and the training input data are backpropagated to the weights of the encoder model 116 and decoder model 120 in order to lower the measured deviation. This process may be iterated multiple times with the parameters of the models 116, 120 optimized at each iteration. Training may be complete when the deviation between the training input data and the output of the decoder model 120 is less than a threshold amount. An additional example for training the encoder model 116 and decoder model 120 is provided herein with respect to FIG. 3. Also, it will be appreciated that the process flow 200 may be executed, in some examples, when the encoder model 116 and decoder model 120 are already trained. If the encoder model 116 and decoder model 120 are already trained, the operation 202 may be omitted.

At operation 204, the obscuring system 102 accesses an input data unit of the input data 104. In examples in which the obscuring system 102 is implemented as a stand-alone system and/or by the data processing system 108, the input data unit may be received from a mobile computing device 134, 136 and/or from a computing system 128, 130. In examples in which the obscuring system 102 is implemented by a mobile computing device 134, 136, and/or computing system 128, 130 the input data unit may be received from a sensor (e.g., via an operating system, memory, or other component), data storage, or other suitable location.

At operation 206, the obscuring system 102 applies the encoder model 116 to the input data 104 to generate the latent space representation in the latent space 118 of the input data 104. At operation 208, the obscuring system 102 applies multi-dimensional noise 122 to the latent space representation. The multi-dimensional noise 122 may be selected, as described herein, to more heavily obscure latent space dimensions that carry private or sensitive information and to less heavily obscure latent space dimensions that carry information related to utility tasks. At operation 210, the obscuring system 102 applies the decoder model 120 to the latent space representation to generate the obscured data 106.

Figure 3:
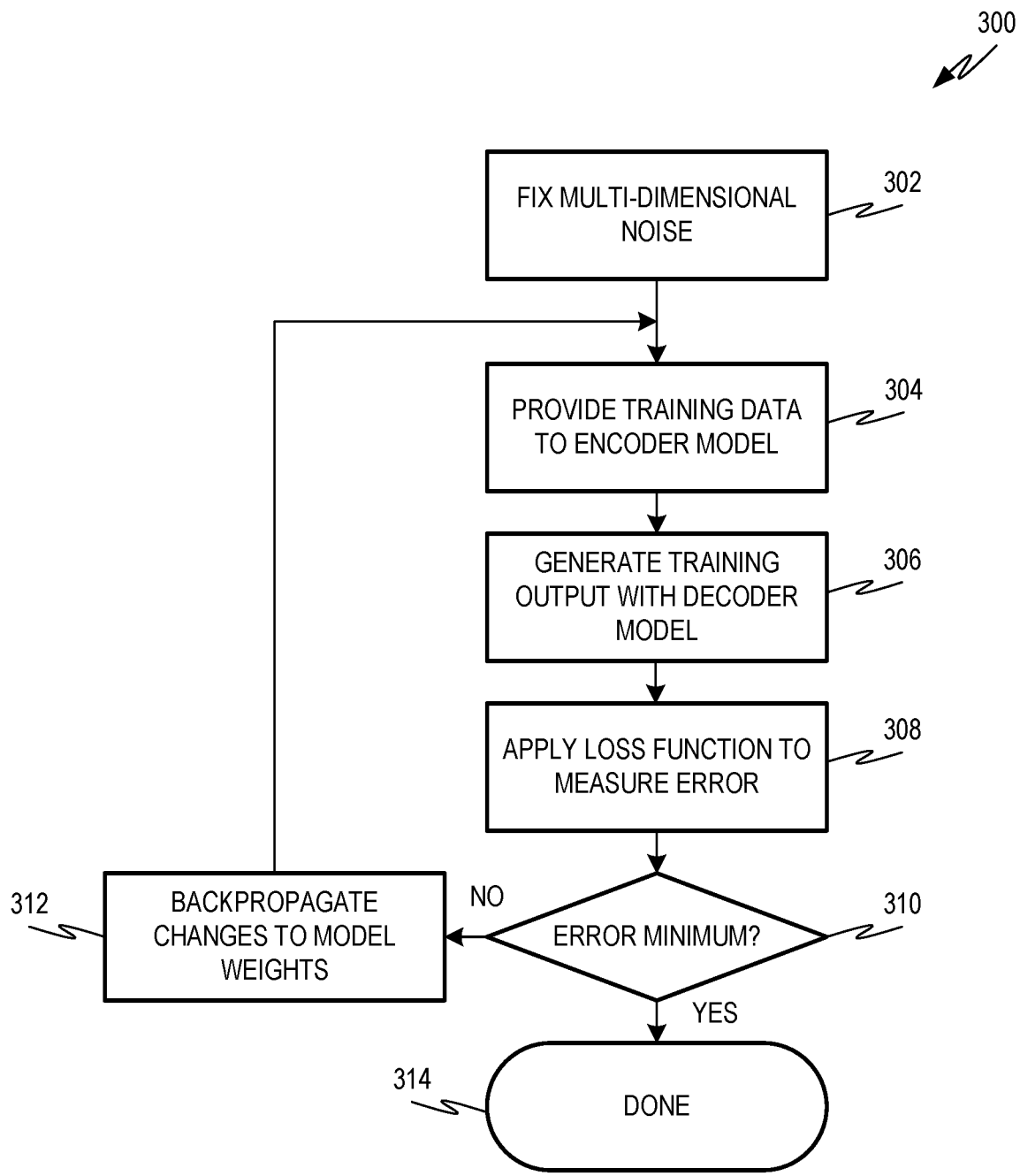
FIG. 3 is a flowchart showing one example of a process flow that may be used to train the encoder-decoder arrangement of FIG. 1.

FIG. 3 is a flowchart showing one example of a process flow 300 that may be used to train the encoder-decoder arrangement of FIG. 1. At operation 302, the value of the multi-dimensional noise 122 is set to a fixed value. For example, the value of the noise-scaling parameter 314 is set to a fixed value, such as unity or one. At operation 304, training data is provided to the encoder model 116. The training data may include one or more sensor data streams.

At operation 306, the encoder model 116 and decoder model 120 are used to generate a training output data unit. For example, the encoder model 116 generates a latent space representation of the training data in the latent space 118. The fixed multi-dimensional noise 122 may be applied to the latent space representation and the result may be mapped back to the feature space by the decoder model 120 to generate the training output data unit.

At operation 308, a loss function is applied to measure a deviation between the training input data unit and the training output data unit. Any suitable loss function or combination of loss functions may be used. Examples of suitable loss functions include a Euclidian error loss function, a mean squared error, a Kullback-Leibler divergence, and the like. In some examples, the total loss used for training can be a combination of more than one loss measurement. For example, the total loss, in some examples, is equal to a reconstruction of a loss between the input and output time series plus a Kullback-Leibler divergence between the standard normal distribution and normal distribution modeled by the mean and variance of the latent space representation.

At operation 310, it is determined whether the error determined at operation 308 is sufficiently small such as, for example, at a minimum. If the error is at a minimum, then the training is complete at operation 314. If the error is not at a minimum, then changes to the weights of the encoder model 116 and decoder model 120 are backpropagated at operation 312 and training data is again provided at operation 304.

In some examples, the loss function used at operation 308 is determined utilizing a maximum-mean discrepancy (MMD) between an actual latent distribution, indicated by the mean and variance, and a desired latent distribution.

In some examples, the desired latent distribution may be or include a multidimensional, symmetric standard such as a Gaussian distribution with a mean of zero and a variance of 1. Also, in some examples, the desired latent distribution may be a bounded probability distribution having a constant density.

Figure 4:
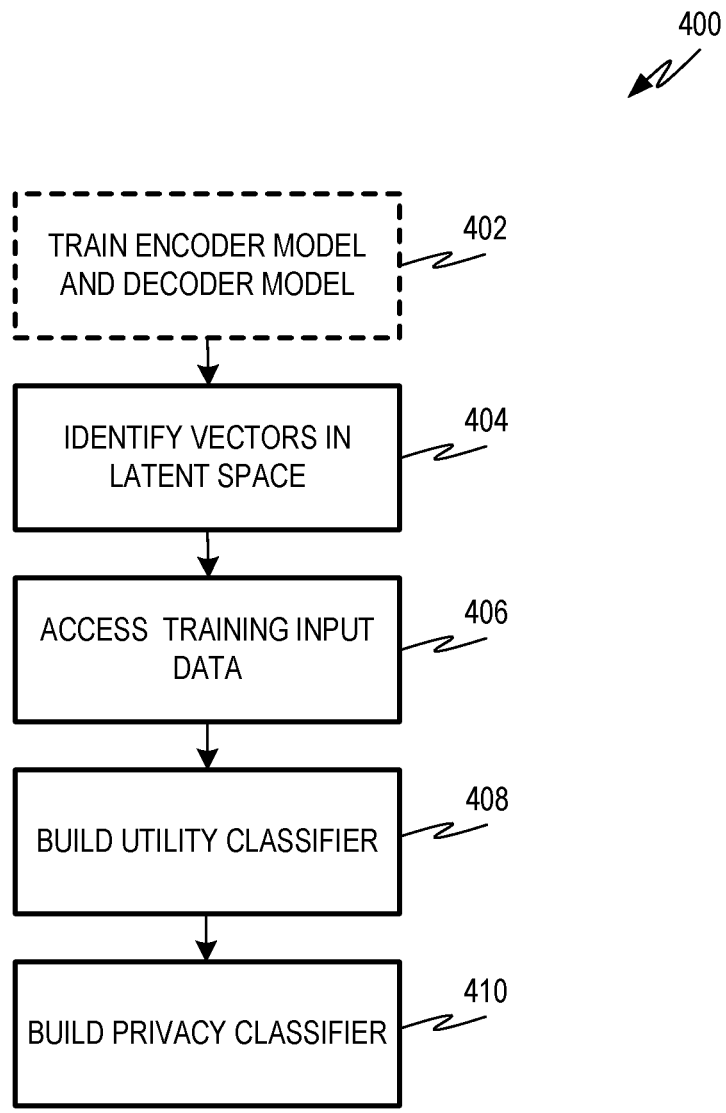
FIG. 4 is a flowchart showing one example of a process flow that may be executed by the obscuring system of FIG. 1.

FIG. 4 is a flowchart showing one example of a process flow 400 that may be executed by the obscuring system 102. For example, the process flow 400 may include pre-processing performed by the obscuring system 102 to prepare to generate multi-dimensional noise 122 for input data 104.

At optional operation 402, the obscuring system trains the encoder model 116 and the decoder model 120, for example, as described herein. In this example, the encoder model 116 may be represented by E, where E(x) is the encoder model 116 applied to an input data unit feature x. Similarly, the decoder model 120 may be represented by D, where D(z) is the decoder model 120 applied to a latent space dimension value z. In some examples, the process flow 400 may be executed when the encoder model 116 and decoder model 120 are already trained. If this is the case, the optional operation 402 may be omitted.

At operation 404, the obscuring system determines a plurality of linearly independent vectors in the latent space 118, which may also be referred to as L. For example, the plurality of interpretable vectors may include n linearly independent vectors, where n is the number of dimensions in the latent space L, as given by Equation [1] below:

$$n = \dim L \quad [1]$$

In some examples, the plurality of linearly independent vectors can be represented as a basis B of the latent space L, as given by Equation [2] below:

$$B = \{v_1, \ldots, v_n\} \quad [2]$$

In Equation [2], the latent space dimensions of the latent space L are represented by $v_i$. Consider a latent space dimension value z that corresponds to an input data unit feature x as given by Equation [3] below:

$$z = E(x) \quad [3]$$

The plurality of linearly independent vectors making the basis B may correspond to interpretable dimensions in the latent space L. As expressed using Equations [1]-[3], an interpretable dimension may be a dimension in the latent space L for which change in a latent space dimension value $z = E(x)$ in that dimension leads to an interpretable change in the decoded output D, given by Equation [4] below:

$$D(z + \lambda v_i) = D(E(x) + \lambda v_i) \quad [4]$$

In Equation [4], $\lambda v_i$ is the change ($\lambda$) in the direction of the latent space dimension corresponding to the vector $v_i$ corresponding to the dimension i of the latent space L. The basis B including the plurality of vectors corresponding to the latent space dimensions may be found in any suitable manner. In some examples, a machine learning model, such as a reconstructor model, is trained using training data that includes input data and modified input data. The machine learning model is trained to, for a given set of input data and modified input data, generate a change in the latent space representation of the input data that brings about a change in the output of the decoder model 120 corresponding to the modified input data. The determined changes may correspond to the latent space dimensions.

At operation 406, the obscuring system 102 accesses training input data. The training input data may include a set of input data units with labeled input data unit features x. For example, each input data unit feature x of the training input data may be described by a triple (x, $y_{util}$, $y_{util}$). In this example, the label $y_{util}$ describes some (discrete valued) utility information (e. g., motion type) contained in the input data unit feature that may be shared. The label $y_{priv}$ describes some (discrete valued) private information (e. g. user ID) contained in the input data unit feature x.

At operation 408, the obscuring system 102 uses the encoder model 116 and training input data to generate a utility classifier. The utility classifier is a model trained to map the various latent space dimension values z to corresponding values of $y_{util}$, as indicated by the training input data. Similarly, at operation 410, the obscuring system uses the encoder model 116 and the training input data to generate a privacy classifier. The privacy classifier is a model trained to map the various latent space dimension values z to corresponding values of $y_{priv}$ as indicated by the training input data. The utility classifier and training classifier may be trained in any suitable manner.

Figure 5:
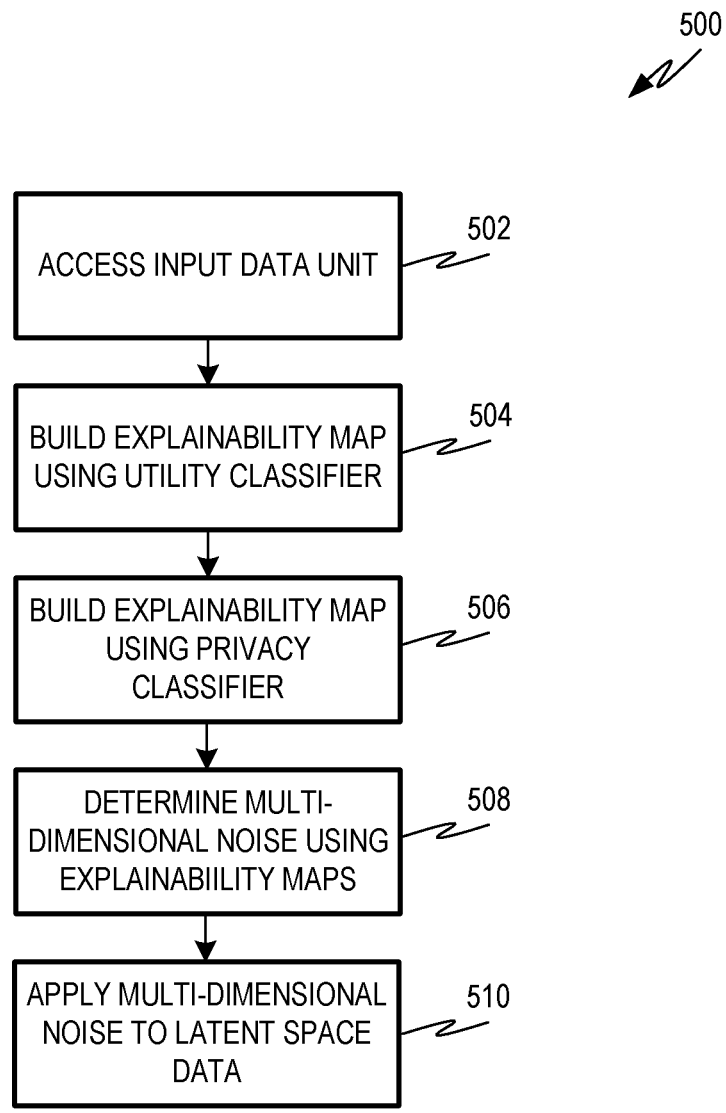
FIG. 5 is a flowchart showing one example of a process flow that may be executed by the obscuring system of FIG. 1 to determine multi-dimensional noise to be applied to an input data unit.

FIG. 5 is a flowchart showing one example of a process flow 500 that may be executed by the obscuring system 102 to determine multi-dimensional noise 122 to be applied to an input data unit. The process flow 500 may be executed, for example, utilizing the utility classifier, privacy classifier, and dimensions of the latent space 118 determined using the process flow 400.

At operation 502, the obscuring system 102 accesses an input data unit. At operation 504, the obscuring system 102 determines an explainability map for the input data unit using the utility classifier. The explainability map may be, for example, a saliency map, a layer wise relevance propagation (LRP), class activation map (CAM), GradCAM, and/or a mapping generated using the smooth stretched algorithm.

The explainability map may include, for each latent space dimension $v_i$, a utility attribution label $s_{util}(i)$. The utility attribution label $s_{util}(i)$ for a latent space dimension $v_i$ is an indication of how relevant that latent space dimension $v_i$ is to a utility task associated with the input data unit. For example, the utility attribution label $s_{util}(i)$ for a latent space dimension $v_i$ describes a degree to which utility-labeled features x of the input data unit are carried by the latent space dimension $v_i$ in the latent space L.

At operation 506, the obscuring system 102 may similarly build an explainability map for the input data unit using the privacy classifier. The explainability map may include, for each latent space dimension $v_i$, a privacy attribution label $s_{priv}(i)$. The privacy attribution label $s_{priv}(i)$ for a latent space dimension $v_i$ is an indication of how relevant that latent space dimension $v_i$ is to a private aspect of the input data unit. For example, the private attribution label $s_{priv}(i)$ for a latent space dimension $v_i$ describes a degree to which private features x of the input data unit are carried by the latent space dimension $v_i$ in the latent space L.

At operation 508, the obscuring system 102 may scale the multi-dimensional noise using the explainability maps determined at operation 504 and 506. For example, the obscuring system 102 may generate a ratio $R_i$ of privacy to utility for some or all of latent space dimensions $v_i$. In some examples, the ratio $R_i$ may be as given by Equation [5] below:

$$R_i = s_{priv}(i) / s_{util}(i) \quad [5]$$

The obscuring system 102 may generate the multi-dimensional noise having values in the various latent space dimensions $v_i$ corresponding to the values of the ratio $R_i$. In this way, relatively more obscuring may be applied to latent space dimensions $v_i$ that carry relatively more private information corresponding to private-labeled input data unit features x while relatively less obscuring may be applied to latent space dimensions $v_i$ that carry relatively more utility information corresponding to utility-labeled input unit data features x.

At operation 510, the obscuring system 102 applies the multi-dimensional noise determined at operation 508 to the input data unit. This may include applying a noise function, such as a Gaussian noise function, to the various latent space dimensions $v_i$ according to $R_i$ or another suitable indicator of privacy for the various latent space dimensions $v_i$. In examples where a Gaussian noise function is used, the variance of the Gaussian noise function $\sigma_i$ in the various latent space dimensions $v_i$ may be given by Expression [6] below:

$$\sigma_i = (s_{priv}(i)/s_{util}(i))\sigma_0 \quad [6]$$

In Expression [6], $\sigma_0$ is the (base) variance of the Gaussian noise function that is used. The value $\sigma_i$ is the latent space dimension-specific variance applied to each of the latent space dimensions $v_i$. For example, the value of the multi-dimensional noise in a given latent space dimension $v_i$ may be described by the ratio $R_i$, the latent space dimension-specific variance $\sigma_i$ in that latent space dimension, the value of the Gaussian noise function considering the latent space dimension-specific variance $\sigma_i$, or any other suitable value. In some examples, the multi-dimensional noise is cropped before being added to the latent space representation of the input data unit. Cropping may include, for example, reducing the values of the attribution labels $s_{util}(i)$, $s_{priv}(i)$, reducing the value of the variance $\sigma_i$, reducing the value of the Gaussian noise determined using the variance $\sigma_i$, or any other suitable cropping technique. Cropping may be applied, for example, if the level of obscuring provided without cropping is too high. This may occur, for example, when the obscured data 106 is too obscured to be suitable for use at the data processing system 108.

After the multi-dimensional noise is applied to the latent space representation, the decoder model 120 may transform the latent space representation back to the feature space to generate obscured data 106, for example, as described herein.

In view of the disclosure above, various examples are set forth below. It should be noted that one or more features of an example, taken in isolation or combination, should be considered within the disclosure of this application.

EXAMPLES

Example 1 is a system for obscuring private information in input data, the system comprising: a computing device comprising at least one processor and an associated storage device, the at least one processor programmed to perform operations comprising: accessing an input data unit; applying an encoder model to the input data unit to generate a latent space representation of the input data unit in a latent space, the latent space having a first latent space dimension and a second latent space dimension; applying multi-dimensional noise to the latent space representation of the input data unit, the multi-dimensional noise having a first value in the first latent space dimension and a second value different than the first value in the second latent space dimension; and applying a decoder model to the latent space representation of the input data unit to generate obscured data unit.

In Example 2, the subject matter of Example 1 optionally includes the operations further comprising: accessing a plurality of labeled input data units, a first labeled input data unit of the plurality of labeled input data units comprising a first input data unit feature, a first utility parameter describing the first input data unit feature, and a first privacy parameter describing the first input data unit feature; generating, using the plurality of labeled input data units, a utility classifier, the utility classifier to map from the latent space to a corresponding utility; and generating, using the plurality of labeled input data units, a privacy classifier, the privacy classifier to map from the latent space to a corresponding privacy.

In Example 3, the subject matter of any one or more of Examples 1-2 optionally includes the operations further comprising: determining, using a utility classifier, a first latent space dimension utility label; determining, using a privacy classifier, a first latent space dimension privacy label; and determining the first value of the multi-dimensional noise using the first latent space dimension utility attribution label and the first latent space dimension privacy attribution label.

In Example 4, the subject matter of Example 3 optionally includes the operations further comprising: generating a privacy explainability map using the input data unit and the privacy classifier, the privacy explainability map comprising a plurality of latent space dimension privacy attribution labels including the first latent space dimension utility attribution label; and generating a utility explainability map using the input data unit and the utility classifier, the utility explainability map comprising a plurality of latent space dimension utility attribution labels including the first latent space dimension utility attribution label.

In Example 5, the subject matter of any one or more of Examples 3-4 optionally includes the operations further comprising: determining a ratio using the first latent space dimension utility attribution label and the first latent space dimension privacy attribution label; and applying the ratio to a noise distribution, the first value of the multi-dimensional noise being based at least in part on the applying of the ratio to the noise distribution.

In Example 6, the subject matter of Example 5 optionally includes the applying of the ratio to the noise distribution comprising applying the ratio to a variance of a Gaussian distribution.

In Example 7, the subject matter of any one or more of Examples 5-6 optionally includes cropping a result of applying the ratio to the noise distribution to determine the first value of the multi-dimensional noise.

In Example 8, the subject matter of any one or more of Examples 1-7 optionally includes the operations further comprising determining a plurality of vectors, the plurality of vectors comprising a first vector corresponding to the first latent space dimension and a second vector corresponding to the second latent space dimension.

Example 9 is a method for obscuring private information in input data, the method comprising: accessing an input data unit by an obscuring system comprising at least one processor; applying, by the obscuring system, an encoder model to the input data unit to generate a latent space representation of the input data unit in a latent space, the latent space having a first latent space dimension and a second latent space dimension; applying, by the obscuring system, multi-dimensional noise to the latent space representation of the input data unit, the multi-dimensional noise having a first value in the first latent space dimension and a second value different than the first value in the second latent space dimension; and applying, by the obscuring system, a decoder model to the latent space representation of the input data unit to generate obscured data unit.

In Example 10, the subject matter of Example 9 optionally includes accessing, by the obscuring system, a plurality of labeled input data units, a first labeled input data unit of the plurality of labeled input data units comprising a first input data unit feature, a first utility parameter describing the first input data unit feature, and a first privacy parameter describing the first input data unit feature; generating, by the obscuring system and using the plurality of labeled input data units, a utility classifier, the utility classifier to map from the latent space to a corresponding utility; and generating, by the obscuring system and using the plurality of labeled input data units, a privacy classifier, the privacy classifier to map from the latent space to a corresponding privacy.

In Example 11, the subject matter of any one or more of Examples 9-10 optionally includes determining, using a utility classifier, a first latent space dimension utility label; determining, using a privacy classifier, a first latent space dimension privacy label; and determining the first value of the multi-dimensional noise using the first latent space dimension utility attribution label and the first latent space dimension privacy attribution label.

In Example 12, the subject matter of Example 11 optionally includes generating, by the obscuring system, a privacy explainability map using the input data unit and the privacy classifier, the privacy explainability map comprising a plurality of latent space dimension privacy attribution labels including the first latent space dimension utility attribution label; and generating, by the obscuring system, a utility explainability map using the input data unit and the utility classifier, the utility explainability map comprising a plurality of latent space dimension utility attribution labels including the first latent space dimension utility attribution label.

In Example 13, the subject matter of any one or more of Examples 11-12 optionally includes determining, by the obscuring system, a ratio using the first latent space dimension utility attribution label and the first latent space dimension privacy attribution label; and applying the ratio to a noise distribution by the obscuring system, the first value of the multi-dimensional noise being based at least in part on the applying of the ratio to the noise distribution.

In Example 14, the subject matter of Example 13 optionally includes the applying of the ratio to the noise distribution comprising applying the ratio to a variance of a Gaussian distribution.

In Example 15, the subject matter of any one or more of Examples 13-14 optionally includes cropping a result of applying the ratio to the noise distribution to determine the first value of the multi-dimensional noise.

In Example 16, the subject matter of any one or more of Examples 9-15 optionally includes determining, by the obscuring system, a plurality of vectors, the plurality of vectors comprising a first vector corresponding to the first latent space dimension and a second vector corresponding to the second latent space dimension.

Example 17 is a machine-readable medium comprising instructions thereon that, when executed by at least one processor, cause the at least one processor to perform operations comprising: accessing an input data unit; applying an encoder model to the input data unit to generate a latent space representation of the input data unit in a latent space, the latent space having a first latent space dimension and a second latent space dimension; applying multi-dimensional noise to the latent space representation of the input data unit, the multi-dimensional noise having a first value in the first latent space dimension and a second value different than the first value in the second latent space dimension; and applying a decoder model to the latent space representation of the input data unit to generate obscured data unit.

In Example 18, the subject matter of Example 17 optionally includes the operations further comprising: accessing a plurality of labeled input data units, a first labeled input data unit of the plurality of labeled input data units comprising a first input data unit feature, a first utility parameter describing the first input data unit feature, and a first privacy parameter describing the first input data unit feature; generating, using the plurality of labeled input data units, a utility classifier, the utility classifier to map from the latent space to a corresponding utility; and generating, using the plurality of labeled input data units, a privacy classifier, the privacy classifier to map from the latent space to a corresponding privacy.

In Example 19, the subject matter of any one or more of Examples 17-18 optionally includes the operations further comprising: determining, using a utility classifier, a first latent space dimension utility attribution label; determining, using a privacy classifier, a first latent space dimension privacy attribution label; and determining the first value of the multi-dimensional noise using the first latent space dimension utility attribution label and the first latent space dimension privacy attribution label.

In Example 20, the subject matter of Example 19 optionally includes the operations further comprising: generating a privacy explainability map using the input data unit and the privacy classifier, the privacy explainability map comprising a plurality of latent space dimension privacy attribution labels including the first latent space dimension utility attribution label; and generating a utility explainability map using the input data unit and the utility classifier, the utility explainability map comprising a plurality of latent space dimension utility attribution labels including the first latent space dimension utility attribution label.

Figure 6:
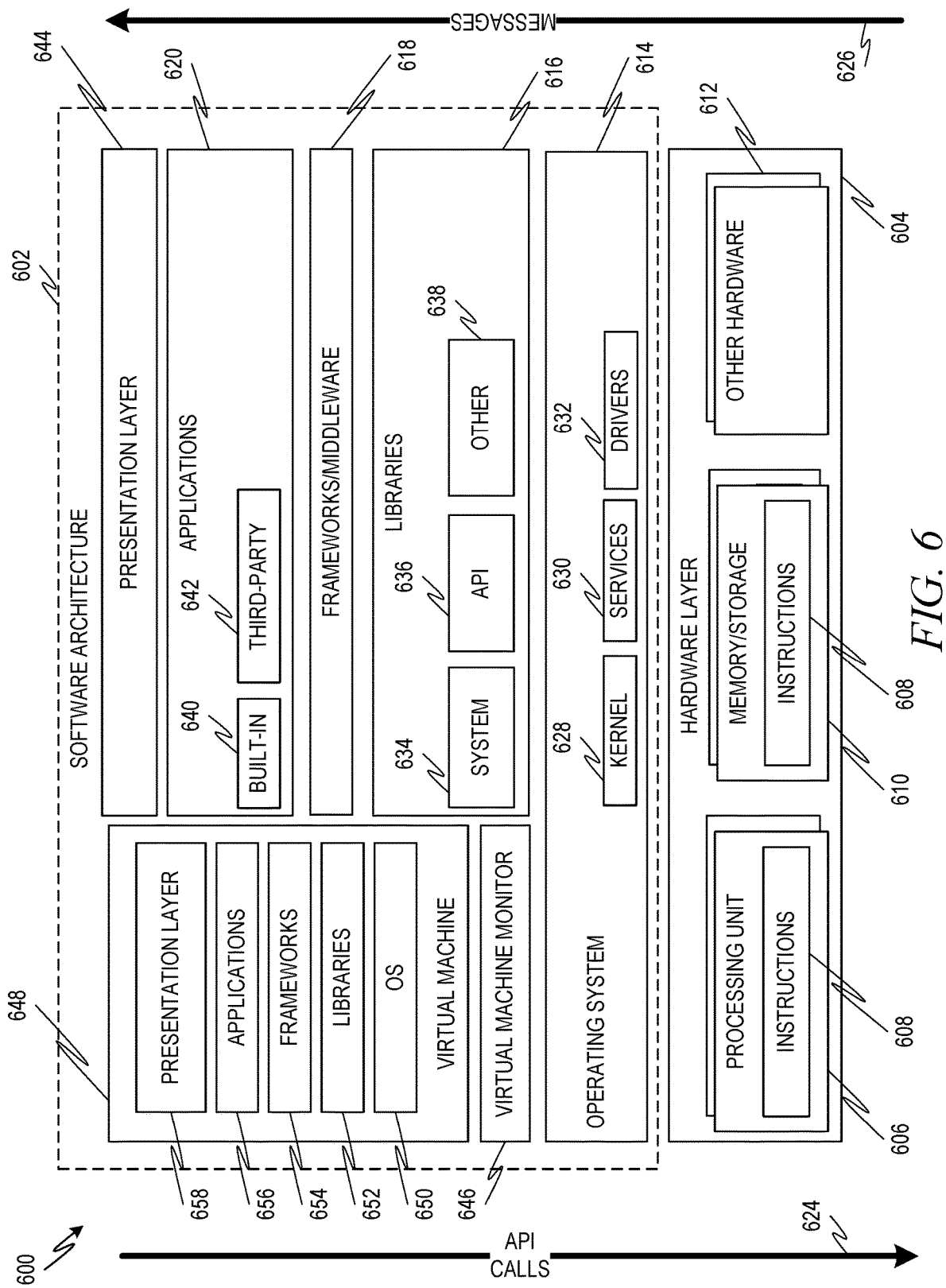
FIG. 6 is a block diagram showing one example of a software architecture for a computing device.

FIG. 6 is a block diagram 600 showing one example of a software architecture 602 for a computing device. The software architecture 602 may be used in conjunction with various hardware architectures, for example, as described herein. FIG. 6 is merely a non-limiting example of a software architecture and many other architectures may be implemented to facilitate the functionality described herein. An example hardware layer 604 is illustrated and can represent, for example, any of the above referenced computing devices. In some examples, the hardware layer 604 may be implemented according to the architecture of the computer system of FIG. 6.

The hardware layer 604 comprises one or more processing units 606 having associated executable instructions 608. Executable instructions 608 represent the executable instructions of the software architecture 602, including implementation of the methods, modules, subsystems, and components, and so forth described herein and may also include memory and/or storage modules 610, which also have executable instructions 608. Hardware layer 604 may also comprise other hardware as indicated by other hardware 612 which represents any other hardware of the hardware layer 604, such as the other hardware illustrated as part of the software architecture 602.

In the example architecture of FIG. 6, the software architecture 602 may be conceptualized as a stack of layers where each layer provides particular functionality. For example, the software architecture 602 may include layers such as an operating system 614, libraries 616, middleware 618, applications 620, and presentation layer 644. Operationally, the applications 620 and/or other components within the layers may invoke application programming interface (API) calls 624 through the software stack and access a response, returned values, and so forth illustrated as messages 626 in response to the API calls 624. The layers illustrated are representative in nature and not all software architectures have all layers. For example, some mobile or special purpose operating systems may not provide middleware 618, while others may provide such a layer. Other software architectures may include additional or different layers.

The operating system 614 may manage hardware resources and provide common services. The operating system 614 may include, for example, a kernel 628, services 630, and drivers 632. The kernel 628 may act as an abstraction layer between the hardware and the other software layers. For example, the kernel 628 may be responsible for memory management, processor management (e.g., scheduling), component management, networking, security settings, and so on. The services 630 may provide other common services for the other software layers. In some examples, the services 630 include an interrupt service. The interrupt service may detect the receipt of an interrupt and, in response, cause the software architecture 602 to pause its current processing and execute an interrupt service routine (ISR) when an interrupt is accessed.

The drivers 632 may be responsible for controlling or interfacing with the underlying hardware. For instance, the drivers 632 may include display drivers, camera drivers, Bluetooth® drivers, flash memory drivers, serial communication drivers (e.g., Universal Serial Bus (USB) drivers), Wi-Fi® drivers, Near Field Communication (NFC) drivers, audio drivers, power management drivers, and so forth depending on the hardware configuration.

The libraries 616 may provide a common infrastructure that may be utilized by the applications 620 and/or other components and/or layers. The libraries 616 typically provide functionality that allows other software modules to perform tasks in an easier fashion than to interface directly with the operating system 614 functionality (e.g., kernel 628, services 630 and/or drivers 632). The libraries 616 may include system libraries 634 (e.g., C standard library) that may provide functions such as memory allocation functions, string manipulation functions, mathematic functions, and the like. In addition, the libraries 616 may include API libraries 636 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 616 may also include a wide variety of other libraries 638, such as machine learning libraries, to provide many other APIs to the applications 620 and other software components/modules.

The middleware 618 (also sometimes referred to as a frameworks layer) may provide a higher-level common infrastructure that may be utilized by the applications 620 and/or other software components/modules. For example, the middleware 618 may provide various graphic user interface (GUI) functions, high-level resource management, high-level location services, and so forth. The middleware 618 may provide a broad spectrum of other APIs that may be utilized by the applications 620 and/or other software components/modules, some of which may be specific to a particular operating system or platform.

The applications 620 include built-in applications 640 and/or third-party applications 642. Examples of representative built-in applications 640 may include, but are not limited to, a contacts application, a browser application, a book reader application, a location application, a media application, a messaging application, and/or a game application. Third-party applications 642 may include any of the built-in applications as well as a broad assortment of other applications. In a specific example, the third-party application 642 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 642 may invoke the API calls 624 provided by the mobile operating system such as operating system 614 to facilitate functionality described herein.

The applications 620 may utilize built in operating system functions (e.g., kernel 628, services 630 and/or drivers 632), libraries (e.g., system libraries 634, API libraries 636, and other libraries 638), middleware 618 to create user interfaces to interact with users of the system. Alternatively, or additionally, in some systems interactions with a user may occur through a presentation layer, such as presentation layer 644. In these systems, the application/module "logic" can be separated from the aspects of the application/module that interact with a user.

Some software architectures utilize virtual machines. In the example of FIG. 6, this is illustrated by virtual machine 648. A virtual machine creates a software environment where applications/modules can execute as if they were executing on a hardware computing device. A virtual machine is hosted by a host operating system (operating system 614) and typically, although not always, has a virtual machine monitor 646, which manages the operation of the virtual machine as well as the interface with the host operating system (i.e., operating system 614). A software architecture executes within the virtual machine 648 such as an operating system 650, libraries 652, frameworks/middleware 654, applications 656 and/or presentation layer 658. These layers of software architecture executing within the virtual machine 648 can be the same as corresponding layers previously described or may be different.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more hardware processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and Machine-Readable Medium

Figure 7:
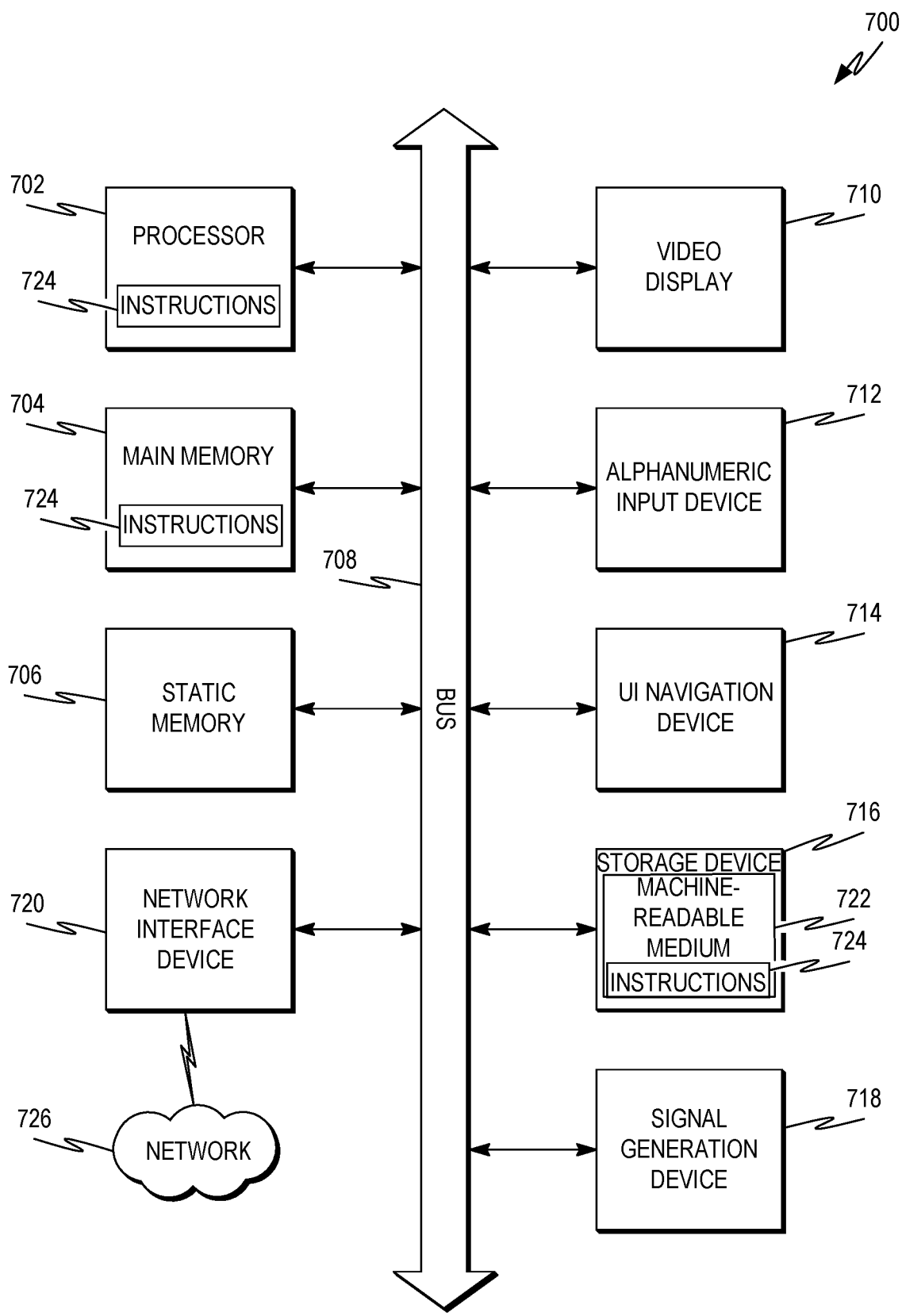
FIG. 7 is a block diagram of a machine in the example form of a computing system within which instructions may be executed for causing the machine to perform any one or more of the methodologies discussed herein.

FIG. 7 is a block diagram of a machine in the example form of a computer system 700 within which instructions 724 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU), or both), a main memory 704, and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard or a touch-sensitive display screen), a user interface (UI) navigation (or cursor control) device 714 (e.g., a mouse), a disk drive unit 716, a signal generation device 718 (e.g., a speaker), and a network interface device 720.

Machine-Readable Medium

The disk drive unit 716 includes a machine-readable medium 722 on which is stored one or more sets of data structures and instructions 724 (e.g., software) embodying or utilized by any one or more of the methodologies or functions described herein. The instructions 724 may also reside, completely or at least partially, within the main memory 704 and/or within the processor 702 during execution thereof by the computer system 700, with the main memory 704 and the processor 702 also constituting machine-readable media 722.

While the machine-readable medium 722 is shown in an example embodiment to be a single medium, the term "machine-readable medium" may include a single medium or multiple media (e.g., a centralized or distributed database, and/or associated caches and servers) that store the one or more instructions 724 or data structures. The term "machine-readable medium" shall also be taken to include any tangible medium that is capable of storing, encoding, or carrying instructions 724 for execution by the machine and that cause the machine to perform any one or more of the methodologies of the present disclosure, or that is capable of storing, encoding, or carrying data structures utilized by or associated with such instructions 724. The term "machine-readable medium" shall accordingly be taken to include, but not be limited to, solid-state memories, and optical and magnetic media. Specific examples of machine-readable media 722 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks. A machine-readable medium is not a transmission medium.

Transmission Medium

The instructions 724 may further be transmitted or received over a communications network 726 using a transmission medium. The instructions 724 may be transmitted using the network interface device 720 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 724 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system for obscuring private information in input data, the system comprising:
   a computing device comprising at least one processor and an associated storage device, the at least one processor programmed to perform operations comprising:
   accessing an input data unit;
      applying an encoder model to the input data unit to generate a latent space representation of the input data unit in a latent space, the latent space having a first latent space dimension and a second latent space dimension;

applying multi-dimensional noise to the latent space representation of the input data unit, the multi-dimensional noise having a first value in the first latent space dimension and a second value different than the first value in the second latent space dimension; and applying a decoder model to the latent space representation of the input data unit to generate an obscured data unit.

2. The system of claim 1, the operations further comprising:

accessing a plurality of labeled input data units, a first labeled input data unit of the plurality of labeled input data units comprising a first input data unit feature, a first utility parameter describing the first input data unit feature, and a first privacy parameter describing the first input data unit feature;

generating, using the plurality of labeled input data units, a utility classifier, the utility classifier to map from the latent space to a corresponding utility; and generating, using the plurality of labeled input data units, a privacy classifier, the privacy classifier to map from the latent space to a corresponding privacy.

3. The system of claim 1, the operations further comprising:

determining, using a utility classifier, a first latent space dimension utility attribution label;

determining, using a privacy classifier, a first latent space dimension privacy attribution label; and determining the first value of the multi-dimensional noise using the first latent space dimension utility attribution label and the first latent space dimension privacy attribution label.

4. The system of claim 3, the operations further comprising:

generating a privacy explainability map using the input data unit and the privacy classifier, the privacy explainability map comprising a plurality of latent space dimension privacy attribution labels including the first latent space dimension utility attribution label; and generating a utility explainability map using the input data unit and the utility classifier, the utility explainability map comprising a plurality of latent space dimension utility attribution labels including the first latent space dimension utility attribution label.

5. The system of claim 3, the operations further comprising:

determining a ratio using the first latent space dimension utility attribution label and the first latent space dimension privacy attribution label; and applying the ratio to a noise distribution, the first value of the multi-dimensional noise being based at least in part on the applying of the ratio to the noise distribution.

6. The system of claim 5, the applying of the ratio to the noise distribution comprising applying the ratio to a variance of a Gaussian distribution.

7. The system of claim 5, further comprising cropping a result of applying the ratio to the noise distribution to determine the first value of the multi-dimensional noise.

8. The system of claim 1, the operations further comprising determining a plurality of vectors, the plurality of vectors comprising a first vector corresponding to the first latent space dimension and a second vector corresponding to the second latent space dimension.

9. A method for obscuring private information in input data, the method comprising:

accessing, by an obscuring system, an input data unit, the obscuring system comprising at least one processor and an associated storage device;

applying, by the obscuring system, an encoder model to the input data unit to generate a latent space representation of the input data unit in a latent space, the latent space having a first latent space dimension and a second latent space dimension;

applying, by the obscuring system, multi-dimensional noise to the latent space representation of the input data unit, the multi-dimensional noise having a first value in the first latent space dimension and a second value different than the first value in the second latent space dimension; and applying, by the obscuring system, a decoder model to the latent space representation of the input data unit to generate an obscured data unit.

10. The method of claim 9, further comprising:

accessing, by the obscuring system, a plurality of labeled input data units, a first labeled input data unit of the plurality of labeled input data units comprising a first input data unit feature, a first utility parameter describing the first input data unit feature, and a first privacy parameter describing the first input data unit feature;

generating, by the obscuring system and using the plurality of labeled input data units, a utility classifier, the utility classifier to map from the latent space to a corresponding utility; and generating, by the obscuring system and using the plurality of labeled input data units, a privacy classifier, the privacy classifier to map from the latent space to a corresponding privacy.

11. The method of claim 9, further comprising:

determining, using a utility classifier, a first latent space dimension utility attribution label;

determining, using a privacy classifier, a first latent space dimension privacy attribution label; and determining the first value of the multi-dimensional noise using the first latent space dimension utility attribution label and the first latent space dimension privacy attribution label.

12. The method of claim 11, further comprising:

generating, by the obscuring system, a privacy explainability map using the input data unit and the privacy classifier, the privacy explainability map comprising a plurality of latent space dimension privacy attribution labels including the first latent space dimension utility attribution label; and generating, by the obscuring system, a utility explainability map using the input data unit and the utility classifier, the utility explainability map comprising a plurality of latent space dimension utility attribution labels including the first latent space dimension utility attribution label.

13. The method of claim 11, further comprising:

determining, by the obscuring system, a ratio using the first latent space dimension utility attribution label and the first latent space dimension privacy attribution label; and applying the ratio to a noise distribution by the obscuring system, the first value of the multi-dimensional noise being based at least in part on the applying of the ratio to the noise distribution.

14. The method of claim 13, the applying of the ratio to the noise distribution comprising applying the ratio to a variance of a Gaussian distribution.

15. The method of claim 13, further comprising cropping a result of applying the ratio to the noise distribution to determine the first value of the multi-dimensional noise.

16. The method of claim 9, further comprising determining, by the obscuring system, a plurality of vectors, the plurality of vectors comprising a first vector corresponding to the first latent space dimension and a second vector corresponding to the second latent space dimension.

17. A machine-readable medium comprising instructions thereon that, when executed by at least one processor, cause the at least one processor to perform operations comprising:
　accessing an input data unit;
　applying an encoder model to the input data unit to generate a latent space representation of the input data unit in a latent space, the latent space having a first latent space dimension and a second latent space dimension;
　applying multi-dimensional noise to the latent space representation of the input data unit, the multi-dimensional noise having a first value in the first latent space dimension and a second value different than the first value in the second latent space dimension; and
　applying a decoder model to the latent space representation of the input data unit to generate an obscured data unit.

18. The machine-readable medium of claim 17, the operations further comprising:
　accessing a plurality of labeled input data units, a first labeled input data unit of the plurality of labeled input data units comprising a first input data unit feature, a first utility parameter describing the first input data unit feature, and a first privacy parameter describing the first input data unit feature;
　generating, using the plurality of labeled input data units, a utility classifier, the utility classifier to map from the latent space to a corresponding utility; and
　generating, using the plurality of labeled input data units, a privacy classifier, the privacy classifier to map from the latent space to a corresponding privacy.

19. The machine-readable medium of claim 17, the operations further comprising:
　determining, using a utility classifier, a first latent space dimension utility attribution label;
　determining, using a privacy classifier, a first latent space dimension privacy attribution label; and
　determining the first value of the multi-dimensional noise using the first latent space dimension utility attribution label and the first latent space dimension privacy attribution label.

20. The machine-readable medium of claim 19, the operations further comprising:
　generating a privacy explainability map using the input data unit and the privacy classifier, the privacy explainability map comprising a plurality of latent space dimension privacy attribution labels including the first latent space dimension utility attribution label; and
　generating a utility explainability map using the input data unit and the utility classifier, the utility explainability map comprising a plurality of latent space dimension utility attribution labels including the first latent space dimension utility attribution label.

* * * * *